(12) United States Patent
Schouterden et al.

(10) Patent No.: US 8,916,649 B2
(45) Date of Patent: Dec. 23, 2014

(54) MULTISTAGE PROCESS FOR PRODUCING ETHYLENE POLYMER COMPOSITIONS

(75) Inventors: Patrick J. C. Schouterden, Wachtebeke (BE); Ruddy A. J. Nicasy, Westerlo (BE); Sarat Munjal, Lake Jackson, TX (US); Robert J. Jorgesen, Scott Depot, WV (US); Burkhard E. Wagner, Highland Park, NJ (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/462,869

(22) Filed: May 3, 2012

(65) Prior Publication Data

US 2012/0214956 A1 Aug. 23, 2012

Related U.S. Application Data

(62) Division of application No. 11/631,588, filed as application No. PCT/US2005/023952 on Jul. 6, 2005, now Pat. No. 8,202,936.

(60) Provisional application No. 60/585,867, filed on Jul. 7, 2004.

(51) Int. Cl.
| | | |
|---|---|---|
| *C08F 10/02* | (2006.01) | |
| *C08F 210/16* | (2006.01) | |
| *C08L 23/04* | (2006.01) | |
| *C08L 23/06* | (2006.01) | |
| *C08F 10/00* | (2006.01) | |
| *C08F 110/02* | (2006.01) | |

(52) U.S. Cl.
CPC .............. *C08F 10/00* (2013.01); *C08F 10/02* (2013.01); *C08F 110/02* (2013.01); *C08F 210/16* (2013.01); *Y10S 526/908* (2013.01)
USPC ............. 525/240; 525/53; 525/245; 525/249; 526/64; 526/65; 526/348; 526/352; 526/908

(58) Field of Classification Search
USPC ........... 525/53, 240; 526/348, 348.6, 352, 64, 526/65, 908
See application file for complete search history.

(56) References Cited

U.S. PATENT DOCUMENTS

| | | | |
|---|---|---|---|
| 4,293,673 A | | 10/1981 | Hamer et al. |
| 4,482,687 A | | 11/1984 | Noshay et al. |
| 4,859,749 A | * | 8/1989 | Franke ........................ 526/124.7 |
| 5,106,926 A | | 4/1992 | Eisinger et al. |
| 5,290,745 A | | 3/1994 | Jorgensen et al. |
| 5,442,018 A | | 8/1995 | Cann et al. |
| 5,494,965 A | | 2/1996 | Harlin et al. |
| 5,503,914 A | | 4/1996 | Michie, Jr. et al. |
| 5,589,539 A | | 12/1996 | Wagner et al. |
| 5,798,314 A | | 8/1998 | Spencer et al. |
| 5,981,664 A | | 11/1999 | Neumann et al. |
| 6,187,866 B1 | | 2/2001 | Jorgensen et al. |
| 6,441,096 B1 | | 8/2002 | Backman et al. |
| 6,617,405 B1 | | 9/2003 | Jorgensen |
| 6,780,808 B2 | | 8/2004 | Wagner et al. |
| 6,924,343 B2 | | 8/2005 | Lindroos et al. |
| 7,160,833 B2 | | 1/2007 | Wagner et al. |
| 7,576,166 B2 | | 8/2009 | Aarila, et al. |
| 8,202,936 B2 | | 6/2012 | Schouterden et al. |
| 2003/0055174 A1 | | 3/2003 | Tsutsui et al. |
| 2003/0149180 A1 | * | 8/2003 | Van Dun et al. ............... 525/240 |
| 2004/0010101 A1 | | 1/2004 | Wagner et al. |
| 2004/0086047 A1 | | 5/2004 | Kondo et al. |
| 2005/0033000 A1 | | 2/2005 | Ohta et al. |
| 2005/0272891 A1 | | 12/2005 | Fouarge et al. |

FOREIGN PATENT DOCUMENTS

| | | |
|---|---|---|
| EP | 0 783 007 A2 | 7/1997 |
| EP | 0 949 274 A2 * | 10/1999 |
| WO | WO-83/00490 | 2/1983 |

OTHER PUBLICATIONS

Rauwendaal, C., Plastics Technology, Mar. 2002, retrieved from http://www.ptonline.com/articles/what's-causing-your-gels.*
Vieweg, Richard et al., "Kunststoff-Handbuck, Band IV, Polyolefine" Munich: Carl Hanser Verlag, 1969, p. 308.
Data sheet of Sylopol 5510, Jul. 2007.
PCT/US2005/023952 International Search Report and Written Opinion of the International Searching Authority, Dec. 2005.
PCT/US2005/023952 International Preliminary Report on Patentability, Jun. 2006.
Susan S. Woods, et al., The Use of Polymer Processing Aids to Reduce Gel Formation in Polyolefin Plastomer Extrusion, Dynecon LLC No. 20 (2000), pp. 1-7.
EP Office Action dated Jun. 26, 2013; from EP counterpart Application No. 05768412.8.
EP Divisional Office Action dated Jun. 20, 2013; from EP Divisional counterpart Application No. 09 013 267.1.
Instructions to EP Divisional Office Action dated Sep. 23, 2013; from EP Divisional counterpart Application No. 09 013 267.1.
EP Divisional Response to Office Action dated Oct. 15, 2013; from EP Divisional counterpart Application No. 09 013 267.1.
India Office Action dated Nov. 14, 2012; from India counterpart Application No. 57/CHENP/2007.
Instructions to India Office Action dated Nov. 11, 2013; from India counterpart Application No. 57/CHENP/2007.
Response to India Office Action dated Nov. 14, 2013; from India counterpart Application No. 57/CHENP/2007.

* cited by examiner

*Primary Examiner* — Roberto Rabago

(57) ABSTRACT

The present invention relates to a process of producing an ethylene polymer composition in multiple stages, of which the first stage is preferably a slurry polymerization stage, in the presence of a catalyst system, comprising: a) a solid catalyst precursor, comprising a transition metal selected from titanium and vanadium; magnesium; a halide, optionally an electron donor; and a solid particulate material comprising an inorganic oxide, and wherein the median particle diameter, $D_{50}$, of the solid catalyst precursor, based upon the total volume of solid catalyst precursor, is from 1 to 13 micrometers; and b) an organoaluminium compound.

2 Claims, 1 Drawing Sheet

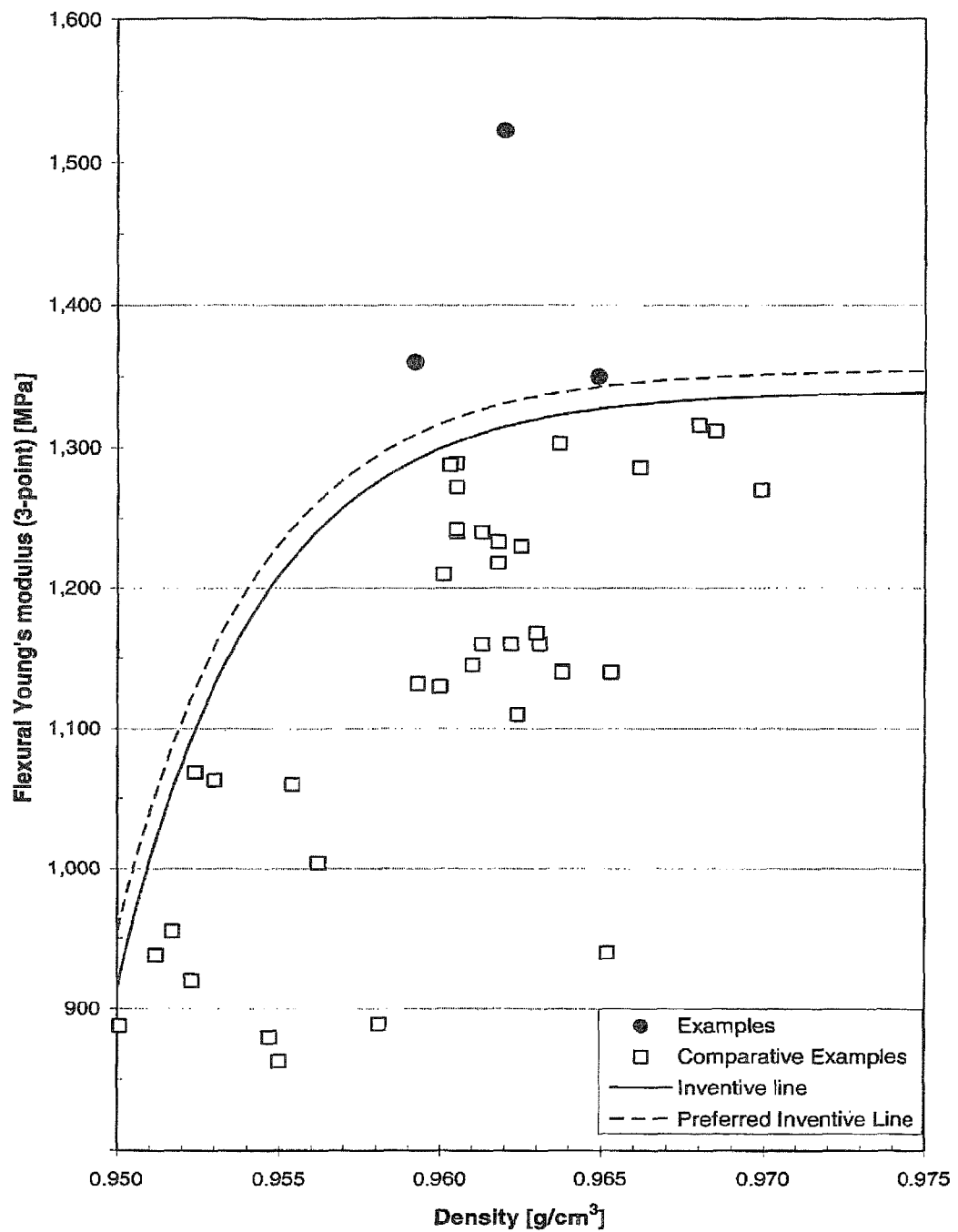

MULTISTAGE PROCESS FOR PRODUCING ETHYLENE POLYMER COMPOSITIONS

CROSS-REFERENCE TO RELATED APPLICATIONS

The present application is a divisional application of the U.S. application Ser. No. 11/631,588, filed on Jan. 4, 2007, U.S. Pat. No. 8,202,936, entitled "MULTISTAGE PROCESS FOR PRODUCING ETHYLENE POLYMER COMPOSITIONS," the teachings of which are incorporated by reference herein, as if reproduced in full hereinbelow, which is a 371 U.S. national phase application of International Patent Application No. PCT/US05/23952, filed on Jul. 6, 2005, which claims priority from the U.S. Provisional Application No. 60/585,867, filed on Jul. 7, 2004.

The present invention relates to a process of producing an ethylene polymer composition, to ethylene polymer compositions obtainable by the process and to articles manufactured therefrom.

Ethylene polymer compositions for use in molded articles, such as pipe, containers, cable jackets and insulations, and films require a good balance of mechanical properties, chemical resistance, processing properties, and optical properties. While a relatively high molecular weight of the polymer is desirable, in combination with a desired higher density of the composition for enhancing certain mechanical properties, the processability of the composition is decreased at higher molecular weight. For this reason, compositions containing polymer components of high molecular weight and low molecular weight have been proposed to address these problems.

Such compositions may be obtained by physical blending, for example, by means of extruders or in other mixers, but are advantageously produced in a multi-staged reaction process to avoid the extra power and cost, and the lesser degree of homogenous blending associated with physical blending processes.

Generally, in producing polymer compositions, it is desirable to use catalysts which have small particle diameters, because such catalysts generally have high activity, which can result in process economies. However, in the case of the multistage processes, for producing ethylene polymer compositions which are known in the art, the use of catalysts having small particle diameters can be problematic. For instance, in PCT application WO 94/22948, which relates to a process for manufacturing olefin homopolymers and copolymers having a bimodal molecular weight distribution, it is noted that, in a multiple-stage process, the fines produced in the first reactor are catalytically very active, which means that they tend to cause local overheating and formation of gels in the end product. Therefore, a need remains to reduce gel levels in ethylene polymer compositions produced in a multistage process, wherein the first stage is carried out in a slurry reactor.

The present invention relates to a process of producing an ethylene polymer composition in multiple stages, comprising polymerizing ethylene, alone, or with a comonomer, to produce ethylene polymer in a first stage, transferring the polymer produced in the first stage into a second stage, in which second stage ethylene is polymerized, alone, or with a comonomer, in the presence of polymer produced in the first stage, and wherein the first stage is a slurry polymerization stage, and the polymerization is carried out in the presence of a catalyst system comprising: a) a solid catalyst precursor, comprising a transition metal selected from titanium and vanadium; magnesium; a halide; optionally an electron donor; and a solid particulate material comprising an inorganic oxide, wherein the median particle diameter of the solid catalyst precursor, based upon the total volume of solid catalyst precursor, $D_{50}$, is from 1 to 13 micrometers; and b) an organoaluminium compound. All individual values and subranges between 1 to 13 micrometers, for the above $D_{50}$, are disclosed herein and included herein.

The present invention further relates to an ethylene polymer composition, obtainable by the process of the present invention, having a density of 0.900-0.980 g/cm$^3$, and more preferably, a density of 0.900-0.970 g/cm$^3$, an MI$_5$ of 0.02-3.5 dg/min, and less than 6 gels larger than 800 micrometer per square meter ($\mu$m/m$^2$), and less than 100 gels in the range from 400 to 800 micrometer per square meter, wherein the number of gels is determined on a 5 square meter (m$^2$) sample of a 50 micrometer thick cast film, prepared from the ethylene polymer composition. The invention also relates to an article of manufacture, comprising the aforementioned composition or a composition obtained by the process of the present invention. The ethylene composition may contain ethylene homopolymers, copolymers, terepolymers, or other multipolymers (polymers containing more than two comonomers). Suitable comonomers include, but are not limited to, $C_3$-$C_{20}$ $\alpha$-olefins and dienes. All individual values and subranges between 3 carbons and 20 carbons, for the $C_3$-$C_{20}$ $\alpha$-olefins, are included herein and disclosed herein.

The present invention further relates to an ethylene polymer compositions which are particularly well suited for downgauging blow molded containers for household and industrial products. The inventive compositions provide molded products with increased stiffness compared to other resins of similar densities.

The increased stiffness is described as high "3-point flexural Young's modulus", according the following equations:

$$F > 1340 * \{1 - \exp[-235*(\rho - 0.9451)]\} \qquad \text{(Eqn. 1)}$$

$$F > 1355 * \{1 - \exp[-235*(\rho - 0.9448)]\} \qquad \text{(Eqn. 2)}$$

with F=3-point flexural Young's modulus (MPa),
$\rho$=density (g/cm$^3$), and
a1, a2 and a3 are each a coefficient.

The invention also provides an ethylene polymer composition having a density of 0.915-0.970 g/cm$^3$, an MI$_5$ of 0.02-3.5 g/10 min, and where the composition has a flexural Young's modulus, as measured on an Instron apparatus according to ISO 178, greater than $1340*\{1-\exp[-235*(\text{density}-0.9451)]\}$, and also provides such a composition in combination with one or more additional features as discussed herein.

The invention also provides an ethylene polymer composition, having a density of 0.915-0.970 g/cm$^3$, an MI$_5$ of 0.02-3.5 g/10 min, wherein the composition has a flexural Young's modulus greater than $1355*\{1-\exp[-235*(\text{density}-0.9448)]\}$, and also provides such a composition in combination with one or more additional features as discussed herein.

The invention also provides compositions, prepared by the processes of the invention, and where the composition comprises a bimodal polyethylene resin, and where, in one embodiment, the bimodal polyethylene resin comprises a high molecular weight ethylene polymer and a low molecular weight ethylene polymer, and wherein the low molecular weight ethylene polymer has a MI$_2$ between 10 g/10 min and 1000 g/10 min, and a density of at least 0.920 g/cm$^3$, and wherein the composition has a density between 0.915 g/cm$^3$ and 0.970 g/cm$^3$. The invention also provides for compositions with one or more other features as described herein.

FIG. 1 depicts flexural Young's modulus versus density profiles.

In the process of the present invention, ethylene polymer compositions are made by polymerizing ethylene, alone, or with a comonomer, to produce ethylene polymer in multiple stages. The process may be carried out, with the different stages being carried out subsequently in the same reactor, in a reactor having multiple stages or reaction zones, or a series of reactors, each consisting of one or more stages. In all embodiments of the present invention, polymer produced in an earlier stage is transferred into a later stage, in which later stage ethylene is polymerized, alone, or with a comonomer, in the presence of polymer produced in an earlier stage. The polymerization in each stage typically occurs by a slurry polymerization, however, the polymerization may occur by another type of polymerization, such as a gas-phase polymerization.

In the process of the present invention, the first stage is preferably a slurry polymerization stage. In a slurry polymerization, a suspension of solid particulate polymer is formed in a liquid polymerization diluent medium, to which ethylene, optionally comonomers, catalyst and optionally, a molecular weight control agent, such as hydrogen, are added. The suspension including the polymer and liquid diluent, also referred to as slurry, is removed from the first stage, preferably intermittently or continuously, followed, optionally, by separation of all or part of the monomer, diluent and other components, such as volatile components. The separated components thus may be recycled, optionally, after a distillation, to the first reaction stage. The liquid diluent employed in the polymerization medium is typically a hydrocarbon, which is liquid under the polymerization conditions employed. The diluent employed should be liquid under the conditions of polymerization and relatively inert. Examples of diluents are aliphatic hydrocarbons, such as propane, butane, pentane, hexane heptane, octane, decane, or dodecane; alicyclic hydrocarbons such as cyclopentane, methylcyclopentane, cyclohexane and methylcyclohexane; and aromatic hydrocarbons such as benzene, toluene, xylene or ethylbenzene. Preferred diluents are alkanes having from 3 to 7 carbon atoms, preferably propane, isobutane, isopentane and hexane, or mixtures thereof.

The reaction stage following the first slurry polymerization stage is a gas phase polymerization stage, a bulk polymerization stage, a solution polymerization stage or a slurry polymerization stage. In a preferred embodiment, the second stage is a slurry polymerization stage. In another preferred embodiment of the present invention, the process consists of two or three polymerization stages in series. In general, it is preferred that all the reaction stages are slurry reaction stages, because these are less susceptible to fouling than gas-phase reactors, when catalysts with small particle diameters are used. Furthermore, in multiple stage processes, which only employ slurry reaction stages, it is generally not necessary to remove the diluent between reaction stages.

The multistage process of the present invention optionally is preceded by a catalyst prepolymerization step, which step is not considered to be a stage of the multistage reaction. Typically, in a catalyst prepolymerization step, less than 5 weight percent, desirably less than 3 weight percent, and most preferably less than 1 weight percent of polymer, based on the total weight of the ethylene polymer composition, is produced.

The multistage process of the present invention is preferably carried out to produce from 5 to 90 weight percent of polymer in the first reactor, and preferably from 10 to 80 weight percent, based on the total ethylene polymer composition. In a preferred embodiment, the process consists of two stages, wherein, in the first stage, from 20-80 weight percent of polymer is produced, and in the second stage, from 80-20 weight percent, based on the weight of the ethylene polymer composition. In a more preferred embodiment, the process consists of two stages, wherein, in the first stage, from 40-60 weight percent of polymer is produced, and in the second stage, from 60-40 weight percent.

In the process of the present invention, the polymerizations may be carried out in any suitable reactor known in the art. Generally tank reactors, loop reactors, bubble columns, tubular reactors, or multitubular reactors are used. The reactors may include agitators, pumps, screw conveyors, static mixers, spargers, distribution and redistribution devices, or baffles. Reactors may incorporate more than one reaction-stage. Such reactors may be tank reactors with internal recirculation or external recirculation through a plug-flow reaction stage, column reactors or ring-and-disc reactors with multiple reaction stages or reactors with multiple feed, and exit nozzles, so positioned that the composition or morphology of the polymer is different in separate parts of the reactor. Reaction stages may be individually cooled, heated or operated adiabatically.

In one embodiment of the process of the present invention, the process is operated continuously, and the first stage comprises a tank, which is optionally a stirred tank, provided with an external circulation section, preferably a tubular or multitubular section, to withdraw slurry produced in the reactor, and circulate it through the external circulation section back into the reactor. The tank and the external circulation section are each independently operated adiabatically or non-adiabatically. Fresh ethylene and the solid catalyst precursor may both be fed to the tank. It is advantageous to withdraw all or preferably a portion of the slurry that enters the external circulation section from the tank reactor, from said stage at a point in the external circulation section after it has passed through at least a portion of said section. In another embodiment of the present invention, the first stage is a tank provided with external circulation through a tubular or multi-tubular section, as described above, where fresh ethylene is fed to the tank, but where the solid catalyst precursor is fed to the (multi-)tubular section, and all or preferably a portion of the slurry that enters the external circulation section from the tank reactor, is withdrawn from said stage at a point in the external circulation section after it has passed through at least a portion of said section, and before the point where the solid catalyst precursor is added to the external circulation section. Preferably the point in the external circulation section where the slurry is removed from the first stage, is chosen such that it takes the slurry at least 30 seconds, preferably at least 60 seconds, and more preferable at least 90 seconds, but advantageously, not more than 600 seconds, preferably not more than 400 seconds to flow from the tank reactor to said slurry discharge point in the external circulation section. These embodiments allow an increase in the average residence time of the catalyst in the first stage, while at the same time, ensuring a minimum residence time of the catalyst particles in the first stage, which can be controlled by the design of the external circulation section, slurry recirculation speed and location of the slurry discharge point. These embodiments can result in a further reduction of gel formation in subsequent reaction stages.

A gas phase polymerization stage following the first or subsequent stages, if used, may be carried out in reactors well known in the art, for instance in a fluidized or stirred-tank reactor, as described in European patent EP-A-713 888, or U.S. Pat. No. 5,589,539, the relevant features of which are incorporated herein by reference.

In the process of the present invention, each stage may be operated continuously, in batch mode or in semi-batch mode, but preferably continuously. The diluent, ethylene monomer, optional comonomer and molecular weight control agent, if any, may be added to each stage, separately, so as to allow control of the reaction conditions separately for each stage.

The catalyst system, used in the method of the present invention, comprises a solid catalyst precursor, comprising a transition metal selected from the group of titanium and vanadium; and further comprises magnesium, a halide, and a solid particulate material, comprising an inorganic oxide, and optionally an electron donor.

The magnesium may be used in the production of the solid catalyst precursor as magnesium metal, which generally reacts with other catalyst components to form magnesium compounds, or the magnesium may be used in the form of a magnesium compound. Suitable magnesium compounds which may be used in the preparation of the solid catalyst precursor include magnesium halides and organomagnesium compounds. In a preferred embodiment, magnesium halides are used, such as magnesium chloride ($MgCl_2$), magnesium bromide ($MgBr_2$), magnesium iodide ($MgI_2$). In a more preferred embodiment, the magnesium halide is magnesium chloride.

The transition metal, used in the preparation of the solid catalyst precursor component, is selected from titanium or vanadium. In a preferred embodiment the titanium or vanadium metal is in the form of a compound which follows the formula:

$$M(R)_a X_b,$$

wherein M is titanium or vanadium, R is $R^i$ or $OR^i$ or $OCOR^i$ where $R^i$ is a $C_1$ to $C_{14}$ aliphatic or aromatic hydrocarbon radical, X is selected from Cl, Br, I, or mixtures thereof, "a" is 0 or 1, "b" is 2 to 4 inclusive, and a+b=3 or 4. Exemplary titanium compounds include $TiCl_3$, $TiCl_4$, $Ti(OC_6H_5)Cl_3$, $Ti(OCOCH_3)Cl_3$, $Ti(OCOC_6H_5)Cl_3$, or mixtures thereof. Exemplary vanadium compounds include vanadium halides. In a preferred embodiment, the vanadium halide is vanadium trichloride. The solid catalyst precursor composition may also comprise mixtures of titanium and vanadium compounds.

In a preferred embodiment, the catalyst further comprises an electron donor compound. The electron donor compound can be an alkyl ester of an aliphatic or aromatic mono- or polycarboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are dialkyl and cycloalkyl ethers having 2 to 20 carbon atoms; dialkyl, diaryl, and alkylaryl ketones having 3 to 20 carbon atoms; and alkyl, alkoxy, and alkoxyalkyl esters of alkyl and aryl carboxylic acids having 2 to 20 carbon atoms. An especially preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate, and anhydrides of dicarboxylic acids, such as phthalic anhydride.

Another especially preferred class of electron donors is a combination of a cyclic aliphatic ether and an aliphatic alcohol. Of this class, especially preferred combinations are tetrahydrofuran with ethanol, n-butanol or isopropanol. Other suitable electron donor combinations that may be used in the process of the present invention are described in U.S. Patent Application Publication 2004/0009869A1, now U.S. Pat. No. 6,780,808, the relevant teachings of which, suitable electron donor combinations, are incorporated herein by reference. Additional information is provided in U.S. 2004/0010101, which is incorporated herein, in its entirety, by reference.

The catalyst precursor composition used in the present invention further comprises a solid particulate material, comprising an inorganic oxide. Suitable inorganic oxides include silica, titanium dioxide, zinc oxide, magnesium oxide, alumina, silica/alumina mixtures. If silica is used, its surface may be modified with reagents capable of reacting with surface silanols. In a preferred embodiment the solid particulate material is silica. The particle size of the solid particulate material may be selected to suit the method chosen for producing the solid catalyst precursor.

If the catalyst precursor is impregnated into the solid particulate material, the solid particulate material, comprising an inorganic oxide, is preferably a porous material, essentially inert to the polymerization. The median particle diameter of the solid particulate material, comprising an inorganic oxide, can generally be of the same order as that of the solid catalyst precursor. The solid particulate material, comprising the inorganic oxide, generally has a surface area, measured according to the method described in the ASTM Standard D-3663-84, of at least 3 $m^2/g$, and preferably at least 50 $m^2/g$; and a pore size, measured according to the method described in ASTM D-4641-87, of at least 8 nanometers, and preferably at least 10 nanometers.

Alternatively, the solid particulate material, comprising an inorganic oxide, may have a particle size which is much smaller than the median diameter of the resulting solid catalyst precursor. In this embodiment, the solid particulate material acts as a filler for the solid catalyst precursor composition, functioning both as a diluent of catalytically active materials, and to provide additional mechanical strength to the spray dried solid catalyst precursor particles. Fumed silica, such as Cab-O-Sil TS-610 (a trademark of Cabot Corporation, USA), is a preferred silica having such much smaller particle size. Such silicas typically comprise primary particles, which form aggregated particles, which are typically in the form of chains. The median particle size of the primary particles is typically less than 100 nanometers, and the aggregates typically have chain lengths of less than 0.5 micrometers. The fumed silica has a surface area measured according to the method described in the ASTM Standard D-3663-84, of at least 50 $m^2/g$ and preferably at least 100 $m^2/g$.

The median particle size of the solid catalyst precursor, $D_{50}$, is based upon the total volume of solid catalyst precursor, and is at least 1 micrometer, preferably at least 4 micrometers, and most preferably at least 6 micrometers. The median particle size, $D_{50}$, is preferably at most 13 micrometers, more preferably at most 11 micrometers and most preferably at most 9 micrometers. All individual values and subranges between 1 micrometer and 13 micrometers are included herein and disclosed herein.

Preferably the solid catalyst precursor satisfies the relationship (or span):

$$2 \geq (D_{90} - D_{10})/D_{50}.$$

The $D_{50}$, as discussed above, is the median particle size of the solid catalyst precursor, based upon the total volume of solid catalyst precursor, or 50 percent by volume of the particles in the sample have a diameter≤the stated value, $D_{50}$. The $D_{10}$ represents 10 percent of the volume of the particles in the sample that have a diameter<the stated value for $D_{10}$. The $D_{90}$ represents 90 percent of the volume of the particles in the sample that have a diameter<the stated value for $D_{90}$. The method to determine these values uses laser light scattering which examines volume averages.

More preferably the solid catalyst precursor satisfies the relationship: $1.6 \geq (D_{90}-D_{10})/D_{50}$, still more preferably $1.5 \geq (D_{90}-D_{10})/D_{50}$, and most preferably $1.0 \geq (D_{90}-D_{10})/D_{50}$.

Typically, the solid catalyst precursor comprises magnesium and transition metal in a molar ratio of 2:1 to 50:1; preferably greater than 5:1, and more preferably from 6:1 to 10:1. All individual ratios and ratio subranges between 2:1 and 50:1 are included herein and disclosed herein.

The solid catalyst precursor composition also typically comprises from 1 to 20 moles of electron donor per mole of the transition metal of solid catalyst precursor component, and preferably from 1 to 10 moles of electron donor per mole of the transition metal. All individual values and subranges between 1 and 20 "moles of electron donor per mole of transition metal of solid catalyst precursor" are include herein and disclosed herein.

If magnesium oxide, aluminum oxide or titanium oxide is used in the solid catalyst precursor, these metals and transition metal in this form are generally catalytically inactive, and therefore their content is not to be included in the calculation of the above-mentioned ratios.

In a preferred embodiment, the solid catalyst precursor comprises from 10 weight percent to 95 weight percent inorganic oxide particulate material, preferably silica, based upon the total weight of the solid catalyst precursor. All individual values and subranges between 10 weight percent and 95 weight percent are included herein and disclosed herein. The solid catalyst precursor may comprises from 10 weight percent to 95 weight percent of a filler material, based upon the total weight of the solid catalyst precursor. All individual values and subranges between 10 weight percent and 95 weight percent are included herein and disclosed herein.

Methods of preparing solid catalyst precursors are well known in the art, as exemplified by U.S. Pat. Nos. 4,482,687, 5,106,926, 5,290,745 and 5,442,018, which relevant parts of each, are incorporated herein, by reference. Typically the solid catalyst precursor composition is formed by contacting a large excess of electron donor compound with the magnesium metal or magnesium compound, transition metal compound, and solid particulate material, comprising an inorganic oxide, in any order, to form a precursor slurry. The mixing of the components generally takes place over several hours, and at a temperature which is below the normal boiling point of the electron donor, but preferably between 20° C. and 80° C. The excess of electron donor is then generally removed after the formation of the catalyst precursor slurry, to form the solid catalyst precursor.

In a preferred embodiment, the catalyst precursor composition is obtained by spray drying, wherein a solution of the catalyst precursor components is prepared and slurried with the solid particulate material. The slurry is then spray dried by methods such as disclosed in U.S. Pat. No. 5,290,745 (incorporated herein in its entirety by reference), whereby the solid particulate material comprising an inorganic oxide of the present application corresponds to the inert filler disclosed in U.S. Pat. No. 5,290,745. The average particle size of the spray dried precursor is generally adjusted by process means during spray-drying, and may optionally be altered by separation or classification techniques after spray-drying.

As mentioned above, the catalyst precursor can be obtained by spray drying. A spray-dried catalyst is the preferred mode of catalyst from. In this option, a solution of the precursor is prepared and slurried with an inert filler. The slurry is then spray dried by methods such as disclosed in U.S. Pat. No. 5,290,745, as discussed above. Generally, the amount of inert filler used, is that which will provide 0.3 to 2.5 millimole of titanium per gram of spray-dried precursor. The fillers which are added to the solution prior to spray drying include any organic or inorganic compounds, which are inert to the titanium compound and the final active catalyst, such as silicon dioxide in the form of fumed silica, titanium dioxide, polystyrene, rubber modified polystyrene, magnesium chloride, and calcium carbonate. The fillers can be used individually or in combination. The spray dried precursor is 10 to 95 percent by weight filler. Typical Mg/Ti atomic ratios in the spray dried precursor range from 3:1 to 10:1. Average particle size and particle size distribution span can be adjusted by process means during spray-drying, and can be, furthermore, altered by separation techniques after spray-drying, although particle classification after drying introduces significant complexity to the process, and is not preferred. Average particle sizes range from 10 to 30 microns using standard shaping and sizing techniques, and may typically run 14 microns or greater for some catalyst systems.

An optional Lewis Acid modification may be accomplished either during catalyst introduction into the first polymerization reactor, during an optional pre-polymerization step or by addition of the Lewis acid directly to the polymerization reactor. The first two techniques are preferred, as lower amounts of Lewis Acid are required to achieve the desired effect. One particularly preferred option is addition of the Lewis Acid during catalyst feed to the reactor in inert hydrocarbon diluent. When this is done, residence times of 1 to 200 minutes are desirable, particularly preferred residence times are 1 to 100 minutes. Apparatus described in U.S. Pat. Nos. 6,187,866 and 6,617,405 are particularly suited to Lewis Acid modification during catalyst feed. The contents of both of these patents are incorporated herein, in their entirety, by reference. The Lewis Acid may also be added to the catalyst precursor in a separate step prior to catalyst feed, isolating this mixture, and then feeding the mixture to the polymerization reactor. The addition of extra process steps, however, makes this a less desirable option. Examples of suitable Lewis Acids are discussed below.

The Lewis Acid modification can also occur during partial activation, if practiced. Again, the apparatus described in U.S. Pat. No. 6,187,866 is particularly preferred. A preferred partial activation system includes a diethylaluminumchloride (Et2AlCl) and trihexylaluminum (Hex3Al) system. The partial activation is also an optional step.

The solid catalyst precursor is combined with a cocatalyst to provide an active polymerization catalyst. Suitable cocatalysts comprise organoaluminium compounds. Preferred organoaluminum compounds have the structure $AlR^{ii}{}_d X^i{}_e H_f$, wherein $X^i$ is Cl or $OR^{iii}$, and $R^{ii}$ and $R^{iii}$ are saturated hydrocarbon radicals containing from 1 to 14 carbon atoms, which radicals may be the same or different, "e" is 0 to 2, "f" is 0 or 1, and d+e+f=3. The $R^{ii}$ and $R^{iii}$ may be substituted with one or more substituents which are inert under the reaction conditions employed during polymerization. Preferably $R^{ii}$ and $R^{iii}$ are alkyl radicals containing from 1 to 8 carbon atoms.

Such cocatalyst compounds can be employed individually or in combination, and include compounds such as $Al(C_2H_5)_3$, $Al(C_2H_5)_2Cl$, $Al_2(C_2H_5)_3Cl_3$, $Al(C_2H_5)_2H$, $Al(C_2H_5)_2(OC_2H_5)$, $Al(C_4H_9)_3$, $Al(i-C_4H_9)_3$, $Al(i-C_4H_9)_2H$, $Al(C_6H_{13})_3$, $Al(C_6H_{13})_2H$, and $Al(C_8H_{17})_3$, $Al(i-C_4H_9)_2(C_6H_{13})$, $Al(i-C_4H_9)(C_6H_{13})_2$, $Al(CH_3)_3$, $Al(C_3H_7)_3$, $Al(i-C_3H_7)_3$, trioctylaluminium, tridecylaluminium, tridodecylaluminium, tribenzylaluminium, trimethylaluminum, triphenylaluminium, trinaphthylaluminium, tritolylaluminium, dibutylaluminium chloride, diethylaluminium chloride, and ethylaluminium sesquichloride. Preferred cocatalysts include diethylaluminium chloride (DEAC), tri-n-hexylaluminium (TnHAl), ethylaluminium dichloride (EADC), tri-butyl aluminium, tri-ethyl aluminium, or mixtures thereof. The molar ratio of cocatalyst to transition metal is generally in the range of 1:1 to 150:1 and is preferably in the range of 10:1 to 30:1. All individual values and subranges between 1:1 and 150:1, are disclosed herein and included herein. Preferred cocatalysts include triethylaluminum, trimethylaluminum and TIBAl.

If desired, the solid catalyst precursor may be partially activated using a cocatalyst compound before it is introduced into the polymerization reactor. In order to maintain maximum catalyst activity, and, if an electron donor is used, the cocatalyst compound is preferably employed in an amount, which will provide the catalyst with a "cocatalyst compound to electron donor" molar ratio from 0.1:1 to 1:1. Such partial activation may be carried out in a hydrocarbon slurry, optionally followed by drying of the resulting mixture to remove the solvent, at temperatures from 20° C. to 80° C., preferably from 50° C. to 70° C. The resulting dried product can then be fed to the polymerization reactor, where the activation is completed with additional cocatalyst compound, which can be the same, or a different, compound. Preferably, the hydrocarbon slurry, containing both the solid catalyst precursor and cocatalyst, may be fed directly to the reactor, or the solid catalyst precursor and cocatalyst each may be added separately to the polymerization reactor. The solid catalyst precursor feed generally contains from 1 weight percent to 75 weight percent of catalyst precursor. Preactivation in the hydrocarbon slurry is described in U.S. Pat. No. 6,187,866, which is incorporated herein, in its entirety, by reference.

In a preferred embodiment, the solid catalyst system comprises:
(i) a titanium based catalyst precursor having the formula $Mg_a Ti(OR)_b X_c (ED)_d$ wherein R is an aliphatic or aromatic hydrocarbon radical having 1 to 14 carbon atoms or COR' wherein R' is an aliphatic or aromatic hydrocarbon radical having 1 to 14 carbon atoms;
each OR group is the same or different;
each X is independently chlorine, bromine, or iodine;
ED is an electron donor;
a is 0.5 to 56;
b is 0, 1 or 2;
c is 2 to 116; and
d is less than or equal to 1.5a+4;
(ii) at least one modifier having the formula BX3 or $AlR_{(3-b)}X_b$ wherein each R is alkyl or aryl, and is the same or different, and X and "b" are as defined above for component (i), and the organoaluminum compound is a hydrocarbyl aluminum cocatalyst.

The titanium based catalyst and its method for preparation are disclosed in U.S. Pat. No. 5,290,745 and U.S. Pat. No. 4,293,673, the relevant parts of each are incorporated herein, in their entirety, by reference.

The catalysts useful in the practice of the invention can be prepared from a titanium compound, a magnesium compound, and an electron donor.

Titanium compounds, which are useful in preparing these catalysts, have the formula $Ti(OR)_b X_e$, wherein R, X, and "b" are as defined above for component (a); "e" is an integer from 1 to 4; and b+e is 3 or 4. Examples of titanium compounds are $TiCl_3$, $TiCl_4$, $Ti(OC_2H_5)_2Br_2$, $Ti(OC_6H_5)Cl_3$, $Ti(OCOCH_3)Cl_3$, and $Ti(OCOC_6H_5)Cl_3$.

The magnesium compounds, which are useful in preparing these catalysts, include magnesium halides such as $MgCl_2$, $MgBr_2$, and $MgI_2$. Anhydrous $MgCl_2$ is a preferred compound. 0.5 to 56, and preferably 1 to 10, moles of the magnesium compounds are used per mole of titanium compounds.

The electron donor used in the catalyst is an organic Lewis base, liquid at temperatures in the range of 0° C. to 200° C., in which the titanium and magnesium compounds are soluble.

Examples of suitable electron donors are alkyl esters of aliphatic or aromatic carboxylic acids, aliphatic ketones, aliphatic amines, aliphatic alcohols, alkyl or cycloalkyl ethers, and mixtures thereof. It is preferred that the electron donors have from 2 to 20 carbon atoms. The preferred electron donors are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

The modifier, or Lewis acid, has the formula BX3 or AlR (3–a)Xa , wherein each R is an alkyl radical having 1 to 14 carbon atoms, and is the same or different; each X is chlorine, bromine, or iodine, and is the same or different; and "a" is 0, 1 or 2. While one or more modifiers can be used, two different modifiers are preferred. Preferred modifiers include alkylaluminum mono- and dichlorides, wherein each alkyl radical has 1 to 6 carbon atoms, boron trichloride, and trialkylaluminums. A particularly preferred modifier combination is diethylaluminum chloride and tri-n-hexylaluminum. 0.1 to 10 moles, and preferably 0.2 to 2.5 moles, of modifier(s) are used per mole of electron donor. The modifiers are considered to be part of the titanium complex. The electron donor, the support, and the cocatalyst are the same as those described above. As noted, the modifier can be similar in chemical structure to the aluminum containing activators. The modifier has the formula $BX_3$ or $AlR_{(3-e)}X_e$ wherein each R is independently alkyl having 1 to 14 carbon atoms; each X is independently chlorine, bromine, or iodine; and "e" is 1 or 2. One or more modifiers can be used. Preferred modifiers include alkylaluminum mono- and dichlorides, wherein each alkyl radical has 1 to 6 carbon atoms; boron trichloride; and the trialkylaluminums. 0.1 to 10 moles, and preferably 0.2 to 2.5 moles, of modifier can be used per mole of electron donor. The molar ratio of modifier to titanium can be in the range of 1:1 to 10:1, and is preferably in the range of 2:1 to 5:1. Since the modifier reacts with the precursor, it becomes part of the precursor; however, it does not affect the average particle size of the precursor to any meaningful extent.

Preferred partial activation agents include, but are not limited to, a diethylaluminum/tri-hexylaluminum system.

The hydrocarbyl aluminum cocatalyst can be represented by the formula R3Al wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms.

Examples of hydrocarbyl aluminum compounds are as follows:
triisobutylaluminum, trihexylaluminum, di-isobutylaluminum hydride, dihexylaluminum dihydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. The preferred cocatalysts are triethylaluminum, triisobutylaluminum, trihexylaluminum, di-isobutylaluminum hydride, and dihexylaluminum hydride. The trialkylaluminum compounds can also serve as modifiers.

If the precursor is supported, silica is the preferred support, and other suitable supports are inorganic oxides such as aluminum phosphate, alumina, silica/alumina mixtures, silica modified with an organoaluminum compound such as triethylaluminum, and silica modified with diethylzinc.

A typical support is a solid, particulate, porous material essentially inert to the polymerization. It is used as a dry powder having an average particle size of 10 to 250 microns, and preferably 30 to 100 microns; a surface area of at least 200 square meters per gram, and preferably at least 250 square meters per gram; and a pore size of at least 80 Angstroms, and preferably at least 200 Angstroms. Generally, the amount of support used is that which will provide 0.1 to 0 5 millimole of titanium per gram of support and preferably 0.2 to 0.3 millimole of titanium per gram of support. Impregnation of the above mentioned catalyst into a silica support is accomplished by mixing the complex and silica gel in the electron donor solvent followed by solvent removal under reduced pressure.

Preferably, the solid catalyst precursor is sprayed dried and comprises the solid particles containing 10 to 95 weight percent filler, as described above.

Where a modifier (or Lewis acid) is used, the modifiers are usually dissolved in an organic solvent such as isopentane or hexane, and, where a support is used, impregnated into the support following impregnation of the titanium compound or complex, after which the supported catalyst precursor is dried. Modifiers are similar in chemical structure and function to the activators. For variations, see, for example, U.S. Pat. No. 5,106,926, the relevant parts of which are incorporated herein by reference. Neither modifiers nor activators have any meaningful effect on the average particle size or span of the precursor. The activator is preferably added separately neat or as a solution in an inert solvent, such as isopentane, to the polymerization reactor at the same time as the flow of ethylene is initiated.

The modifier may be added to the catalyst precursor in the presence of monomer or the absence of monomer. One preferred method is to add the modifier to the catalyst precursor in a slurry, as the catalyst is introduced into the reactor system. Residence times of 1 to 100 minutes may be used.

The ethylene polymer composition produced in the process of the present invention is produced by polymerizing ethylene alone or with a comonomer. Preferably, the comonomer used, is an alpha-olefin having 3 to 12 carbon atoms. All individual values and subranges between 3 and 12 carbon atoms are included herein and disclosed herein. The alpha-olefins comonomers used most preferably have 3 to 8 carbon atoms, and can be, for example, propylene, 1-butene, 1-pentene, 1-hexene, 4-methyl- 1-pentene, 1-heptene or 1-octene. Preferably no more than one or two alpha-olefin comonomers per reactor, in addition to ethylene, are used. Where it is desired to produce a copolymer, the mole ratio of alpha-olefin to ethylene is generally in the range of 0.005:1 to 0.6:1, preferably in the range of 0.01:1 to 0.42:1, and most preferably in the range of 0.02:1 to 0.26:1. All individual mole ratios and subranges between 0.005:1 and 0.6:1 are included herein and disclosed herein.

Preferably, the solid catalyst precursor and cocatalyst are fed only to the first reaction stage. Modification of the precursor may occur during catalyst feed to the first reaction stage. Preferably, the solid catalyst precursor is obtained by a spray drying. Cocatalyst may be fed also to any of the subsequent reaction stages. Operating the process in this manner generally reduces the number of gels formed in the ethylene polymer composition.

Molecular weight controlling agents, preferably hydrogen, can optionally be fed to each reaction stage to control the $MI_2$ and $MI_5$ values of the ethylene polymer composition and its components.

In a typical process, according to the method of the present invention, the solid catalyst precursor and cocatalyst, diluent, ethylene, optional comonomers, and optionally hydrogen, are continuously fed into the first reactor in which the slurry polymerization takes place; the polymer/catalyst mixture is continuously withdrawn as a suspension from the first reaction stage. Unreacted monomer and comonomer, hydrogen and diluent can be partially or wholly removed from the suspension. These materials can be removed from the process or recycled, optionally after distillation, to the first reaction stage. The polymer/catalyst mixture is then transferred to the second and subsequent reaction stages. Together with the polymer produced in the earlier stages, ethylene, optionally comonomers, hydrogen, and cocatalyst may be continuously fed to the second and subsequent reaction stages. Preferably, fresh solid catalyst precursor is not fed to subsequent reaction stages. The final product is continuously removed from the final reaction stage.

The operating temperature in each reaction stage is generally such that the polymer particles formed, do not substantially soften or melt or dissolve. Typical temperatures are in the range of 60° C. to 110° C. The pressure in each reactor stage is generally in the range of 5 to 30 bars. The pressure in the first reaction stage is preferably in the range of 7 to 20 bar. The ethylene partial pressure, residence time, and amount of solid catalyst precursor and amount of cocatalyst, are set in each reaction stage according to the desired amount of polymer produce. The balance of the total pressure is provided by comonomer other than ethylene and an inert gas such as nitrogen.

Preferably, a relatively low molecular weight polymer is prepared in the first stage, which is then transferred to the second and optionally subsequent reaction stages, in which a relatively high molecular weight polymer is prepared. This sequence may be reversed, although this is less preferred. The ratio of hydrogen to ethylene present in the stage to produce the relatively low molecular weight component, expressed in moles of hydrogen per moles of ethylene present in the liquid phase, is generally in the range of 0.035 to 0.60, and is preferably in the range of 0.10 to 0.40. If the reaction stages producing the high molecular weight polymer are also slurry reaction stages, then the ratio of hydrogen to ethylene, for the reaction stages producing the high molecular weight polymer, is generally in the range of 0.0001 to 0.05, and is preferably in the range of 0.001 to 0.02.

The characteristics of the ethylene polymer composition formed are described by using the melt flow rates $MI_2$ and $MI_5$ measured according to ASTM D 1238-04. The melt flow rate of the relatively low molecular weight ethylene polymer leaving the first reaction stage, is determined according to ASTM D 1238-04, Condition 190° C./2.16, $MI_2$. If the polymer produced, in the first stage, is the relatively high molecular weight component, its melt flow rate is determined according to ASTM D 1238-04, Condition 190° C./21.6, $MI_2$ 1.6. The melt flow rate of the ethylene polymer composition, leaving the final reaction stage, is determined according to ASTM D 1238-04, Condition 190° C./5, $MI_5$.

The relatively low molecular weight ethylene polymer, leaving the first stage, preferably has an $MI_2$ in the range from 10 to 1000 grams per 10 minutes, preferably in the range from 15 to 750 grams per 10 minutes, and more preferably in the range from 20 to 500 grams per 10 minutes. All individual values and subranges between 10 g/10 minutes and 1000 g/10 minutes are included herein and disclosed herein.

The density of the relatively low molecular weight ethylene polymer, produced in the first reaction stage, is generally at least 0.920 g/cm$^3$, preferably from 0.940 g/cm$^3$ to 0.980 g/cm$^3$, and is more preferably in the range of 0.950 g/cm$^3$ to 0.975 g/cm3. All individual values and subranges between 0.920 g/cm$^3$ and 0.980 g/cm$^3$ are included herein and disclosed herein. This component is preferably an ethylene homopolymer or an ethylene copolymer containing up to 10 weight percent of an $C_{4-10}$ alpha-olefin comonomer. All values and subranges between 1 weight percent and 10 weight percent are included herein and incorporated herein.

The relatively high molecular weight ethylene polymer, if produced in the first reactor, preferably has an $MI_2$ 1.6 in the range of from 0.01 to 50 g/10 min, more preferably from 0.05 to 30 g/10 min. All individual values and subranges between 0.01 g/10 minutes and 50 g/10 minutes are included herein and disclosed herein.

The density of this relatively high molecular weight component is preferably from 0.870 g/cm$^3$ to 0.950 g/cm$^3$, or to 0.965 g/cm$^3$, more preferably from 0.880 to 0.955 g/cm$^3$. All individual values and subranges between 0.870 g/cm$^3$ and 0.965 g/cm$^3$ are included herein and disclosed herein. This component is preferably an ethylene copolymer containing up to 30 weight percent of an $C_{4-10}$ alpha-olefin comonomer, preferably up to 25 weight percent comonomer. All values and subranges between 1 weight percent and 30 weight percent are included herein and incorporated herein. The relatively high molecular weight ethylene polymer produced in a second reactor may have a density from 0.900 g/cm$^3$ to 0.980 g/cm$^3$. All individual values and subranges between 0.900 g/cm$^3$ and 0.980 g/cm$^3$ are included herein and disclosed herein.

The ethylene polymer composition removed from the final reaction stage generally has an $MI_5$ in the range from 0.02 to 5 grams per 10 minutes, preferably in the range from 0.04 to 3.5 grams per 10 minutes, and most preferably in the range from 0.08 to 1.0 grams per 10 minutes. All individual values and subranges between 0.02 grams per 10 minutes and 5 grams per 10 minutes are included herein and disclosed herein.

The density of the ethylene polymer composition leaving the final reaction stage, is generally from 0.900 g/cm$^3$ to 0.980 g/cm$^3$, and preferably from 0.915 g/cm$^3$ to 0.970 g/cm$^3$, and more preferably in the range of 0.916 g/cm$^3$ to 0.965 g/cm$^3$. All individual values and subranges between 0.900 g/cm$^3$ and 0.980 g/cm$^3$ are included herein and disclosed herein.

In a preferred embodiment, the median, $D_{50}$, polymer particle size produced from the first polymerization stage is from 100 to 300 micrometers, and more preferably from 150 to 250 micrometer, and most preferably from 180 to 220 micrometers. All individual values and subranges between 100 micrometers to 300 micrometers are included herein and disclosed herein.

In another embodiment, the median, $D_{50}$, polymer particle size produced from a second polymerization stage is from 150 to 350 micrometers, and more preferably from 200 to 300 micrometer, and most preferably from 210 to 260 micrometers. All individual values and subranges between 150 micrometers to 350 micrometers are included herein and disclosed herein.

Typically, the polymer product is a multiphase composition, when looked at the micro level (nanometers), and a uniform solid solution of two polymer components when looked at on the macro level (micron and submicron). Typically, no distinct phases are detected by FTIR microscopy or SEM.

The ethylene polymer compositions obtained by the multistage process of the present invention advantageously have low gel levels. Preferably, the ethylene polymer compositions exhibit less than 6 gels per square meter (m$^2$), having a size greater than 800 micrometer, and less than 100 gels per square meter, having a size in the range from 400 to 800 micrometer, more preferably less than 3 gels per square meter, having a size greater than 800 micrometer, and less than 75 gels per square meter, having a size in the range from 400 to 800 micrometer, and most preferably less than 1 gel per square meter, having a size greater than 800 micrometer, and less than 50 gels per square meter, having a size in the range from 400 to 800 micrometer. The number and size of gels is determined on a 5 square meter sample of a 50 micrometer thick cast film, prepared from the ethylene polymer composition. In determining the size of the gels in the compositions, formed from the processes of the present invention, the area of the gel is measured, such as by means of a digital camera, or by visual inspection, or other suitable means, and expressed as the diameter of a circle having the same area. A gel is defined as a polyethylene defect in the film, and does not include other defects, like dust and fibers from a cardboard box.

Most preferably, the ethylene polymer composition, obtained by the multistage process of the present invention, has a density of from 0.900 g/cm$^3$ to 0.980 g/cm$^3$, preferably from 0.915 g/cm$^3$ to 0.970 g/cm$^3$, more preferably in the range of from 0.916 g/cm$^3$ to 0.965 g/cm$^3$, and most preferably from 0.935 g/cm$^3$ to 0.965 g/cm$^3$. All individual values and subranges between 0.900 g/cm$^3$ and 0.980 g/cm$^3$ are included herein and disclosed herein.

In addition, most preferably, the ethylene polymer composition, obtained by the multistage process of the present invention, has a an $MI_5$ in the range from 0.02 to 5 g/10 min, preferably in the range from 0.04 g/10 min to 3.5 g/10 min, and most preferably in the range from 0.08 g/10 min to 1.0 g/10 min, or to 2.0 g/10 min; and comprises from 20 to 80 weight percent, and preferably from 40 to 60 weight percent, based on the total weight of the composition, of an ethylene polymer, having a density of at least 0.920 g/cm$^3$, preferably from 0.940 g/cm$^3$ to 0.980 g/cm$^3$, and more preferably in the range of 0.950 to 0.975 g/cm$^3$; and an $MI_2$ in the range from 10 g/10 min to 1000 g/10 min, preferably in the range from 15 g/10 min to 750 g/10 min, and most preferably in the range from 20 g/10 min to 500 g/10 min; the ethylene polymer composition exhibiting less than 6 gels per square meter (m$^2$), having a size greater than 800 micrometer, and less than 100 gels per square meter, having a size in the range from 400 to 800 micrometer, more preferably less than 3 gels per square meter, having a size greater than 800 micrometer, and less than 75 gels per square meter, having a size in the range from 400 to 800 micrometer, and most preferably less than 1 gel per square meter, having a size greater than 800 micrometer, and less than 50 gels per square meter, having a size in the range from 400 to 800 micrometer, and wherein the size and number of gels are determined on a 5 square meter sample of a 50 micrometer thick cast film, prepared from the ethylene polymer composition.

Conventional additives can be introduced into the ethylene polymer composition, such as antioxidants, ultraviolet absorbers, antistatic agents, pigments, dyes, nucleating agents, fillers, nano-fillers, slip agents, fire retardants, plasticizers, processing aids, lubricants, stabilizers, smoke inhibitors, viscosity control agents, and crosslinking agents, and boosters, tackifiers, and antiblocking agents. Apart from the fillers, the additives can be present in the composition in amounts of 0.1 to 10 parts by weight of additive for each 100 parts by weight of the ethylene polymer composition. Fillers can be added in amounts up to 200 parts by weight, and more, for each 100 parts by weight of the ethylene polymer composition. Suitable additives additionally include other polyethylene based resins, including but not limited to, DOWLEX™, ATTANE™ and AFFINITY™ resins, all available from The Dow Chemical Company.

The ethylene polymer composition can be extruded into film, fibers, tapes, or processed into various molded articles, such as containers, articles for daily use, pipes and tubes, by T-die molding, compression molding, inflation molding, blow molding, injection molding and extrusion. Furthermore, the copolymers can be extrusion-coated on other films, sheets, wires or cables, or co-extruded together with another film or sheet to prepare various composite films or laminated structures. Furthermore, the copolymers can be used in the fields of steel pipe coating materials, wire coating materials and expansion-molded articles.

Another embodiment of the present invention is an article of manufacture which comprises an ethylene polymer composition according to the present invention as described above.

The inventive compositions are particularly well suited for downgauging blow molded containers for household and industrial products. The inventive compositions provide molded products with increased stiffness compared to other resins of similar densities.

Any numerical ranges recited herein, include all values from the lower value to the upper value. As an example, if it is stated that a compositional, physical or mechanical property, such as, for example, melt index, density, modulus, etc., is from 100 to 1,000, it is intended that all individual values, such as 100, 101, 102, etc., and sub ranges, such as 100 to 144, 155 to 170, 197 to 200, etc., are expressly enumerated in this specification. These are only examples of what is specifically intended, and all possible combinations of numerical values between the lowest value and the highest value enumerated, are to be considered to be expressly stated in this application. Numerical values have been recited, as discussed herein, in reference to melt index, density, weight percentage of a component, particle size and other properties.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer, usually employed to refer to polymers prepared from only one type of monomer, and the term interpolymer as defined hereinafter.

The term "interpolymer" as used herein refers to polymers prepared by the polymerization of at least two different types of monomers. The generic term interpolymer thus includes copolymers, usually employed to refer to polymers prepared from two different monomers, and polymers prepared from more than two different types of monomers.

The invention is further illustrated by means of the following examples, which are intended to illustrate the invention, and are not to be construed as limiting the scope of the invention.

The median particle diameter, $D_{50}$, is measured by means of a Malvern Mastersizer S modular particle size analyzer (available from Malvern Instruments Ltd., UK), calibrated with Uniform Polymer Size Standard polymer microspheres (from Duke Scientific Corporation, Palo Alto, USA) with a $D_{50}$ of 8.9 micrometers ±0.3 micrometers.

Information regarding particle distributions can be found in The Malvern Instruments Operator's Guide, Man 0247 Issue 2.0 (1999); which is incorporated herein, in its entirety by reference.

The compositions produced, were characterized by the following tests:

The $MI_2$ is determined according to ASTM-D-1238-04, Condition 190° C./2.16 on compression molded plaques.

The $MI_5$ is determined according to ASTM-D-1238-04, Condition 190° C./5.0 on compression molded plaques.

The pellet density of the olefin polymers is determined by the displacement method, employing the Archimedes principle, as described in ASTM-D-792. The solvent used is iso-propyl alcohol.

Gel counts are determined on a 5 square meter ($m^2$) sample of the film, using a Model FS-3 gel counter, available from OCS GmbH (Germany). The counter comprises a digital scanning camera, a lighting source and computer with software to conduct the count. The gel counts are reported as the number of gels per $m^2$ of film.

In order to prepare the film sample for gel count testing, a sample of the ethylene polymer composition to be tested, is first stabilized, such as, by blending with 2500 ppm Irganox B-215 (available from Ciba-Geigy) and 1000 ppm calcium stearate. The blending is carried out under relatively mild conditions to prevent significant change in the gel number during blending. A twin screw co-rotating extruder (model MP19TC, available from APV Baker Industrial Extruders Division, United Kingdom) is used for this purpose, and is equipped with two 19 mm diameter screws, each with a screw length to screw diameter ratio (L/D-ratio) of 40:1. The extruder is operated with a temperature profile of 190° C. to 210° C., at 3 kg/hr, and a screw speed of 300 rpm. No screen pack is used, and a nitrogen purge on the feed hopper is used to reduce the oxygen content.

A cast film of 50 micrometer thickness is then produced by extrusion of the stabilized composition. The film extrusion is carried out on a Haake Rheomex model Rheodrive-3000, type 250, a "¾-inch" extruder (available from Haake Mess-Technik GmbH, Germany), equipped with three heat zones (temperature profile 190° C. to 210° C.), equipped with a standard "¾-inch" screw (Type Rheomex 252 from Haake Mess-Technik GmbH), having an L/D-ratio of 25 and a compression ratio 3:1, and a flat sheet die (available from OCS GmbH, Germany) of "10 cm width" and 0.5 mm die gap. The film extrusion train includes a haul-off unit (model QCS CR-8 available from OCS GmbH, Germany), which is equipped with guiding rolls and a chill roll operated at 75° C., with automatic tension control at 5.5 Newton (N).

EXAMPLE 1 a) Preparation of the Solid Catalyst Precursor

The solid catalyst precursor was prepared essentially according to the process described in example 1 parts (a) and (b) of U.S. Pat. No. 5,290,745, incorporated herein, in its entirety, by reference.

The solid catalyst precursor was prepared in two stages. First, a slurry was produced, and then the slurry was spray dried to obtain the solid catalyst precursor.

The titanium trichloride catalyst component was prepared in a vessel equipped with pressure and temperature control, and a turbine agitator. A nitrogen atmosphere (<5 ppm H2O) was maintained at all times.

Granulated magnesium metal, having a particle size of 0 1 mm to 4 mm, was added, under nitrogen, to an excess of tetrahydrofuran at a temperature of 50° C., such that the weight ratio of magnesium to tetrahydrofuran was 1:800. Minor amounts of triethylaluminum were added to scavenge moisture in the solvent. Typically, a 0.01 to 0.02 molar amount (based on THF) was added. Titanium (IV) chloride was added to the mixture in a mole ratio of magnesium to titanium of 1:2.

The mixture was continuously agitated. The exotherm resulting from the addition of titanium tetrachloride caused the temperature of the mixture to rise to approximately 72° C. over a period of three hours. The temperature was held at 70° C. by heating for approximately another four hours. At the end of this time, magnesium dichloride was added, so that the ratio of magnesium to titanium in the mixture rises to 5:1, and heating was continued at 70° C. for another eight hours. The mixture was then filtered through a 100 micron (μm) filter to remove undissolved magnesium dichloride and unreacted magnesium.

CAB-O-SIL TS-610 fumed silica (available from Cabot Corporation) was then added, under nitrogen, to the filtered mixture, over a period of two hours; the resulting slurry being stirred by means of a turbine agitator for several hours thereafter, to thoroughly disperse the fumed silica. The resulting slurry was spray dried using an 8-foot diameter closed cycle spray dryer equipped with a rotary atomizer. The rotary atomizer was adjusted to give catalyst particles with a $D_{50}$ of 8.6 μm. The scrubber section of the spray dryer was maintained at approximately −4° C. The recycle gas flow rate is in the range of 15-25 kg gas per kg of slurry feed.

Nitrogen gas was introduced into the spray dryer at an inlet temperature of 150° C. to 160° C., and was circulated at a rate of approximately 1700 kg/hour. The catalyst slurry was fed to the spray dryer at a temperature of 35° C. and a rate of 90-95 kg/hour, or sufficient to yield an outlet gas temperature of approximately 110° C. to 120° C. The atomization speed was adjusted as required to achieve the desired particle size. The atomization pressure was slightly above atmospheric.

The discrete catalyst particles prepared above were mixed with mineral oil under a nitrogen atmosphere in a 400 liter vessel equipped with a turbine agitator to form a slurry. Component amounts are shown in Table 1.

TABLE 1

Slurry Preparation

| Slurry Preparation | Example 2 and Comp. Example 1 (wt percent) | Typical Range (wt percent) | Example 1 |
|---|---|---|---|
| Tetrahydrofuran | 86.5 | 83 to 91 | 90.9 |
| Cab-O-Sil | 6.3 | 4 to 7 | 4.3 |
| Mg metal | 0.11 | .05 to .2 | 0.072 |
| MgCl$_2$ | 5 | 3 to 6 | 3.3 |
| Total MgCl$_2$ | 0 | | 3.5 |
| TiCl$_4$ | 1.9 | 1.5 to 3 | 1.27 |
| TEAL | 0.3 | .1 to .4 | 0.20 |
| Mg/Ti Molar) | | 5 to 6.5 | | b) Preparation of the Ethylene Polymer Composition

The ethylene polymer composition was prepared in a multi-stage process consisting of two stirred-tank reactors in series, each having a volume of 10 liter, and operated at a liquid level of 70 percent. The reactors were each equipped with a mixing blade which is operated at 1000 revolutions per minute.

A stream, comprising hexane diluent, tri-n-butylaluminium and the solid catalyst precursor described above, was fed continuously to the first reactor at a rate of 1.8 kilograms per hour (kg/hr).

Ethylene was also fed continuously to the first reactor, at a rate of 0.85 kg/hr, and hydrogen, at a rate of 6.8 grams per hour. The absolute pressure in the first reactor was maintained at 13 bar, by adjusting the feed rate of the ethylene. The melt flow rate of the ethylene polymer composition, MI$_2$, is adjusted by changing the flow rate of hydrogen. The temperature in the first reactor was maintained by means of jacket cooling to a temperature of 80° C.

The ethylene polymer composition formed in the first reactor was transferred continuously to the second reactor. In the second reactor, ethylene was fed continuously at a rate of 1.3 kg/hr, and 1-butene is added at a rate of 0.130 kg/hr, to control the density of the polymer in the second reactor at a target of 0.951 g/cm$^3$. The absolute pressure in the second reactor was maintained at 7 bar by adjusting the feed rate of the ethylene. The melt index of the polymer composition leaving the second reactor was controlled by venting the gas phase of the second reactor.

The ethylene polymer composition leaving the second reactor was continuously fed to a flash drum maintained at 1.3 bar and 70° C., in which the volatile material was flashed off to leave a dry ethylene polymer composition powder.

EXAMPLE 2

Example 2 was conducted in the same procedure as described in Example 1, except that median particle size of the catalyst is 10.3 micrometers. The resulting ethylene polymer composition has a low gel content.

COMPARATIVE EXAMPLE 1

The ethylene polymer composition of comparative Example 1 was obtained using a solid catalyst precursor particle size, $D_{50}$ of 14.7 micrometers. Compared to Examples 1 and 2, the ethylene polymer composition of Comparative Example 1 contains a considerable numbers of gels.

Table 2 is a summary of the characteristics of ethylene polymer compositions produced by the method of the present invention in Examples 1 and 2, as well as of an ethylene polymer composition, produced by a method not within the scope of the present invention, in Comparative Example.

TABLE 2

Summary of the Characteristics of the Ethylene Polymer Compositions

| | Sample | | |
|---|---|---|---|
| | Example 1 | Example 2 | Comparative Example 1 |
| Catalyst Particle Size $D_{50}$ (μm) | 8.6 | 10.3 | 14.7 |
| $(D_{90} - D_{10})/D_{50}$ | 1.26 | 1.11 | 1.22 |
| Weight fraction 1st polymer; 2nd polymer | 0.47:0.53 | 0.47:0.53 | 0.47:0.53 |
| 1st Reactor Temperature (° C.) | 90 | 90 | 80 |
| 1st Reactor Pressure (bar) | 12 | 12 | 12 |
| MI$_2$ (g/10 min) of 1st polymer | 75 | 75 | 75 |
| 2nd Reactor Temperature (° C.) | 80 | 80 | 70 |

TABLE 2-continued

Summary of the Characteristics of
the Ethylene Polymer Compositions

| | Sample | | |
|---|---|---|---|
| | Example 1 | Example 2 | Comparative Example 1 |
| 2nd Reactor Pressure (bar) | 12 | 12 | 12 |
| Overall MI$_5$ (g/10 min) | 0.24 | 0.23 | 0.28 |
| Pellet Density (g/cm$^3$) | 0.950 | 0.951 | 0.952 |
| Gel Counts | | | |
| # gels/m$^2$ of size ≥801 μm | 0 | 0 | 10 |
| # gels/m$^2$ of size 401-800 μm | 34 | 59 | 380 |

EXAMPLE 3, 4 AND 5

The catalyst system used, contained: a) a solid catalyst precursor prepared in the same manner as in Example 1, with the rotary atomizer speed adjusted to give solid catalyst precursor particles with a mean diameter as listed in Table 3, and b) an organoaluminium compound tri-n-butylaluminium in a molar ratio Al/Ti=50. The solid catalyst precursor satisfied the relationship: 2≥(D$_{90}$–D$_{10}$)/D$_{50}$, where D$_{50}$ is the median particle diameter, D$_{10}$ and D$_{90}$ are described as above.

Bimodal polyethylene was prepared in a commercial 2-reactor cascade slurry process, using the following reaction conditions listed in Table 3.

TABLE 3

Bimodal Polyethylene Reaction Conditions

| Sample | Example 3 | Example 4 | Example 5 |
|---|---|---|---|
| Catalyst Particle Size D$_{50}$ (μm) | 12.1 | 12.1 | 9.7 |
| Catalyst Particle Size D$_{50}$ (μm) | 7.5 | 7.5 | 5.2 |
| Catalyst Particle Size D$_{50}$ (μm) | 21.4 | 21.4 | 16.1 |
| (D$_{90}$ – D$_{10}$)/D$_{50}$ | 1.15 | 1.15 | 1.12 |
| Production rate (kg/h) | 5429 | 5429 | 6394 |
| Diluent | hexane | hexane | hexane |
| Weight fraction 1st polymer; 2nd polymer | 0.56:0.44 | 0.56:0.44 | 0.56:0.44 |
| Comonomer type in 1st reactor | none | none | none |
| 1st Reactor Temperature (° C.) | 86 | 86 | 88 |
| 1st Reactor Pressure (bar) | 8.4 | 8.4 | 7.5 |
| MI$_2$ (g/10 min) of 1st polymer powder | 70 | 70 | 100 |
| 2nd Reactor Temperature (° C.) | 78 | 78 | 78.6 |
| 2nd Reactor Pressure (bar) | 2.7 | 2.7 | 1.78 |
| Comonomer type in 2nd reactor | 1-butene | none | 1-butene |
| Overall pellet MI$_2$ (g/10 min) | 0.16 | 0.23 | 0.14 |
| Pellet Density (g/cm$^3$) | 0.9592 | 0.9649 | 0.9620 |

Note:
Powder melt index, MI$_2$, is measured according to ASTM-1238, Condition 190° C./2.16 kg. Density is measured according to ASTM D-792

For Example 3 and 4, the bimodal powder obtained, was compounded on a Coperion W&P 160 mm twin screw extruder, with 1000 ppm calcium stearate and 870 ppm Irganox B225. Example 5 was obtained by extruding the bimodal powder on a twin screw extruder Leistritz ZSE-65 with 1000 ppm calcium stearate, 600 ppm Irganox 1010 and 1500 ppm Irgafos 168.

All comparative examples are commercially available resins.

Samples were compression molded according to ASTM 4703-02 Procedure c. A "3-point flexural Young's modulus" was measured on an Instron apparatus, according to ISO 178. The "3-point flexural Young's modulus" is a measure of the stiffness of the sample. Densities and 3-point flexural Young's moduli are listed in Table 4.

As shown in FIG. 1, the "3-point flexural Young's modulus" is unexpectedly high compared to the moduli of different HDPE resins (labeled as Comparative Examples). Moreover, when the densities of the resins are compared, the inventive resins show a much higher "3-point flexural Young's moduli."

The following equations can be used to rank the resins based on the "3-point flexural Young's modulus" and density properties, where F=3-point flexural Young's modulus (MPa),
ρ=density (g/cm$^3$), and
a1, a2 and a3 are each a coefficient.

$$F > 1340*\{1-\exp[-235*(\rho-0.9451)]\} \quad \text{(Eqn. 1)}$$

$$F > 1355*\{1-\exp[-235*(\rho-0.9448)]\} \quad \text{(Eqn. 2)}$$

The inventive resins can be described by 'Eqn. 1," which is represented by the lower, solid line (or profile) on FIG. 1. More preferred inventive resins are described by 'Eqn. 2," which is represented by the upper, dashed line (or profile) on FIG. 1.

TABLE 4

Densities and 3-point flexural Young's modulus

| | Density [g/cm$^3$] | Modulus [MPa] |
|---|---|---|
| Example 3 | 0.9592 | 1360 |
| Example 4 | 0.9649 | 1350 |
| Example 5 | 0.9620 | 1522 |
| Comp. Ex. 1 | 0.9554 | 1060 |
| Comp. Ex. 2 | 0.9562 | 1004 |
| Comp. Ex. 3 | 0.9600 | 1130 |
| Comp. Ex. 4 | 0.9601 | 1210 |
| Comp. Ex. 5 | 0.9605 | 1240 |
| Comp. Ex. 6 | 0.9605 | 1289 |
| Comp. Ex. 7 | 0.9603 | 1288 |
| Comp. Ex. 8 | 0.9625 | 1230 |
| Comp. Ex. 9 | 0.9631 | 1160 |
| Comp. Ex. 10 | 0.9613 | 1160 |
| Comp. Ex. 11 | 0.9622 | 1160 |
| Comp. Ex. 12 | 0.9618 | 1218 |
| Comp. Ex. 13 | 0.9613 | 1240 |
| Comp. Ex. 14 | 0.9637 | 1303 |
| Comp. Ex. 15 | 0.9593 | 1132 |
| Comp. Ex. 16 | 0.9630 | 1168 |
| Comp. Ex. 17 | 0.9662 | 1286 |
| Comp. Ex. 18 | 0.9680 | 1316 |
| Comp. Ex. 19 | 0.9550 | 863 |
| Comp. Ex. 20 | 0.9638 | 1141 |
| Comp. Ex. 21 | 0.9699 | 1270 |
| Comp. Ex. 22 | 0.9581 | 889 |
| Comp. Ex. 23 | 0.9685 | 1312 |
| Comp. Ex. 24 | 0.9638 | 1140 |
| Comp. Ex. 25 | 0.9653 | 1140 |
| Comp. Ex. 26 | 0.9624 | 1110 |
| Comp. Ex. 27 | 0.9652 | 940 |
| Comp. Ex. 28 | 0.9610 | 1145 |
| Comp. Ex. 29 | 0.9547 | 880 |
| Comp. Ex. 30 | 0.9605 | 1242 |
| Comp. Ex. 31 | 0.9605 | 1272 |
| Comp. Ex. 32 | 0.9618 | 1233 |
| Comp. Ex. 33 | 0.9517 | 955 |
| Comp. Ex. 34 | 0.9524 | 1069 |
| Comp. Ex. 35 | 0.9512 | 938 |
| Comp. Ex. 36 | 0.9530 | 1063 |
| Comp. Ex. 37 | 0.9523 | 920 |
| Comp. Ex. 38 | 0.9501 | 888 |

What is claimed is:
1. A composition comprising:
a solid comprising a mixture of first and second ethylene polymers, from 0.1 to 10 parts by weight of a stabilizing agent for each 100 parts by weight of the mixture, and a plurality of gels of varying size dispersed in the solid, wherein said composition has a density of 0.950-0.970 g/cm$^3$, an MI$_5$ of 0.08 to 1.0 g/10 min, a 3-point flexural Young's modulus when compression molded, as measured on an Instron apparatus according to ISO 178, greater than $$1.340*\{1\text{-exp}[-235*(\text{density}-0.9451)]\}; \text{ and}$$

wherein a 5 m$^2$ sample of a 50 micrometer thick cast film prepared from a sample of the composition exhibits both of:
(i) less than 6 gels per m$^2$ of a size greater than 800 micrometers, and
(ii) less than 100 gels per m$^2$ of a size in the range from 400 to 800 micrometers.

2. An article of manufacture comprising the composition of claim 1.

* * * * *

UNITED STATES PATENT AND TRADEMARK OFFICE
CERTIFICATE OF CORRECTION

| | |
|---|---|
| PATENT NO. | : 8,916,649 B2 |
| APPLICATION NO. | : 13/462869 |
| DATED | : December 23, 2014 |
| INVENTOR(S) | : Patrick J. C. Schouterden et al. |

It is certified that error appears in the above-identified patent and that said Letters Patent is hereby corrected as shown below:

On The Title Page, Item (75) "(US) Robert J. Jorgesen", should read "(US) Robert J. Jorgensen"

Signed and Sealed this
Twenty-first Day of April, 2015

Michelle K. Lee
*Director of the United States Patent and Trademark Office*